United States Patent Office 3,609,946
Patented Oct. 5, 1971

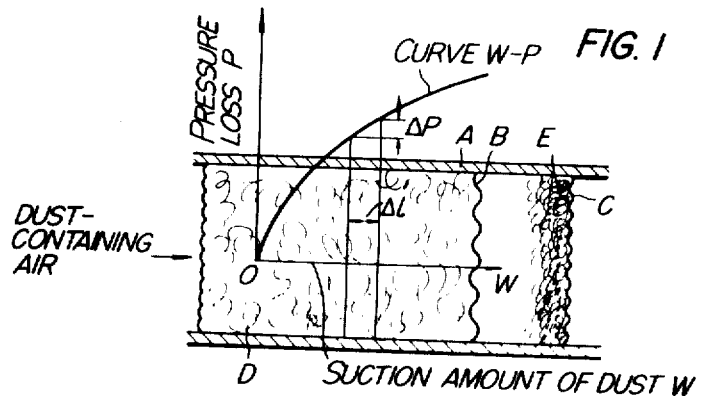
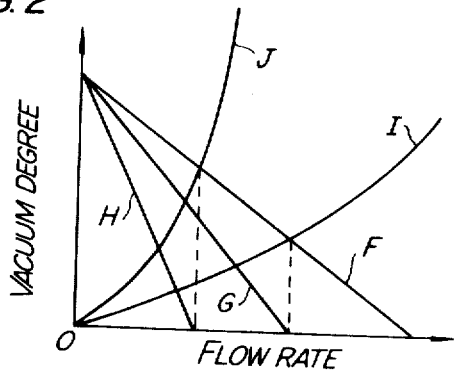
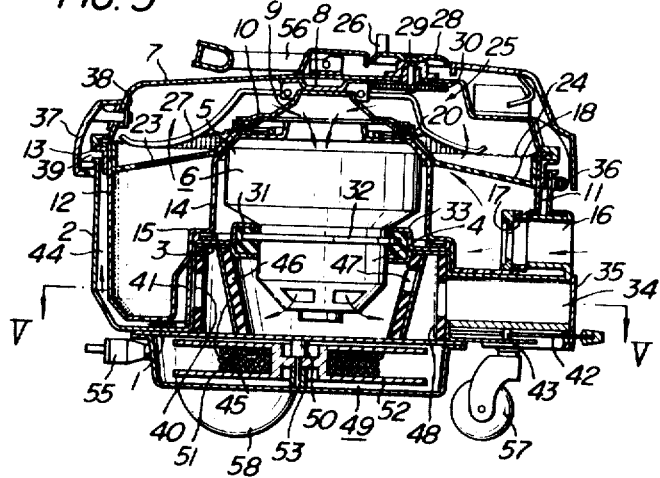

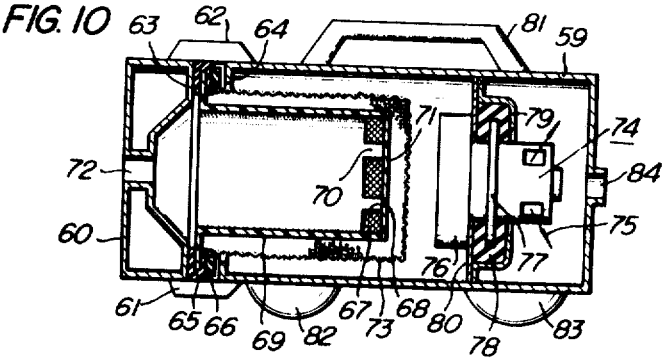
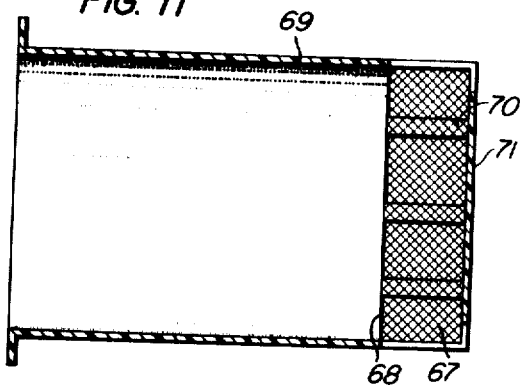
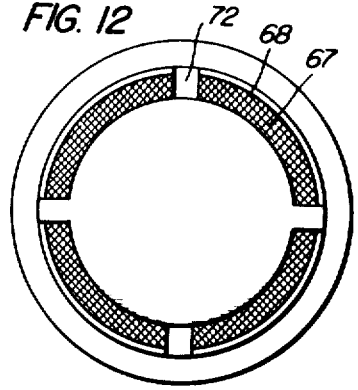
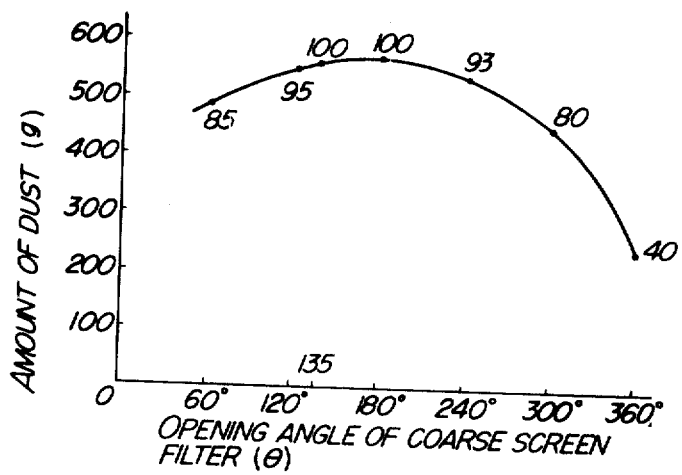

3,609,946
ELECTRIC SUCTION CLEANER
Hisashi Nakagawa, Hajime Mizuno, Hideya Koshiyama, and Goro Sasai, Hitachi-shi, Japan, assignors to Hitachi, Ltd., Tokyo, Japan
Filed June 28, 1968, Ser. No. 741,170
Claims priority, application Japan, July 5, 1967, 42/42,782, 42/42,784
Int. Cl. A47l 9/14
U.S. Cl. 55—296                                                6 Claims

ABSTRACT OF THE DISCLOSURE

An electric suction cleaner which is so designed that the dust collected in a dust case from a dust-containing air flow is compressed by the energy of the dust-containing air flow so as to increase the dust collecting capacity of the dust case, the dust case being composed of substantially non-air permeable walls except for the portions where inlet means for the dust-containing air and filter means for collecting the dust from the dust-containing air are provided.

---

The present invention relates to an electric suction cleaner and more particularly to such an electric suction cleaner which is so designed that the dust collected in a dust case is compressed therein.

It is an essential requirement for an electric suction cleaner, no matter what type it may be, to increase the volume of the dust to be accumulated in a limited air space, i.e. in a dust case.

For this purpose, some of the conventional electric suction cleaners have disposed in a dust case filter means of coarse mesh, adapted to collect relatively large flue and paper chips, and filter means of finer mesh, e.g. a cloth filter, adapted to collect fine particles of sand, so as selectively to collect various dust particles by the size thereof. Namely, with the electric suction cleaners of this type, the operating time before the filter means are clogged can be extended considerably and accordingly it is possible to collect more dust than with the other types of conventional electric suction cleaners.

However, the so-called light and flimsy dusts, such as flue and paper chips, whose apparent volume is extremely large relative to their weight, which have been sucked into the dust case, tend to be deposited more at that portion of the filter closer to the suction inlet than at the other portions.

For this reason, there has been the drawback that the suction ability of the conventional suction cleaners is quickly reduced by the dust deposited in the vicinity of the suction inlet and the amount of dust collected in the dust case is relatively small relative to the volume of said dust case, no matter how large in volume the dust case may be.

An object of the present invention is to provide an electric suction cleaner which is so designed that the dust led into a dust case along with air and collected therein is compressed by the energy of the air being sucked, whereby the apparent volume of the dust deposited in said dust case is reduced providing for the collection of more dust than would otherwise be possible.

Another object of the present invention is to provide an electric suction cleaner wherein the filter means has a dual structure consisting of a filter element of coarse mesh which is less susceptible to clogging, and a filter element of finer mesh, so as to collect dust selectively, whereby the operating time before the filter means becomes clogged can be extended and the amount of the dust collected can be increased.

Still another object of the present invention is to provide an electric suction cleaner which is easy in handling during actual use and low in costs.

Other objects of the present invention will become apparent from the following description of embodiments thereof taken in conjunction with the accompanying drawings.

According to one aspect of the invention, there is provided an electric suction cleaner which comprises suction means for dust along with air, a dust case, inlet means for introducing the dust-containing air into said dust case, the dust case being of a substantially non-air permeable structure having an inlet and an outlet for air, the dust case defining an air space of such configuration as to positively direct the flow of dust-containing air passing through the inlet toward the outlet for a predetermined distance at least in the vicinity of the inlet, filter means of relatively coarse mesh being less susceptible to clogging and disposed at the outlet for collecting dust of large size from the dust-containing air and providing the compression with the dust collected thereon by the energy of the flow of dust-containing air by cooperation of the air space, whereby the apparent volume of the dust collected thereon becomes reduced, and filter means of finer mesh disposed on the down-stream side of the first filter means for collecting dust of smaller size from the dust-containing air.

According to another aspect of the present invention, there are provided dust cases which are substantially non-air permeable and provided with filter means of coarse mesh which is hardly clogged and disposed in a relatively spaced position from a dust-containing air inlet of the dust case, and filter means of finer mesh which is disposed on the down-stream side of the first filter means.

Other objects, feature and advantages of the present invention will be readily apparent from the following detailed description of certain preferred embodiments taken in conjunction with the accomapnying drawings, in which:

FIG. 1 is a diagrammatical view for the purpose of explaining the principle of the dust compressing action in the electric suction cleaner according to this invention;

FIG. 2 is a chart illustrating the relationship between the resistance to air flow and the output of suction means;

FIG. 3 is a vertical cross-sectional view of an embodiment of the present electric suction cleaner;

FIG. 10 is a vertical cross-sectional view of still another embodiment of the present electric suction cleaner;

FIG. 11 is a vertical cross-sectional view showing the structure of another form of the dust case used in the electric suction cleaner shown in FIG. 9;

FIG. 12 is view of the dust case shown in FIG. 11 as viewed from the right-hand side thereof; and FIG. 13 is a chart illustrating the performance of the electric suction cleaner of this invention.

Figure 4:
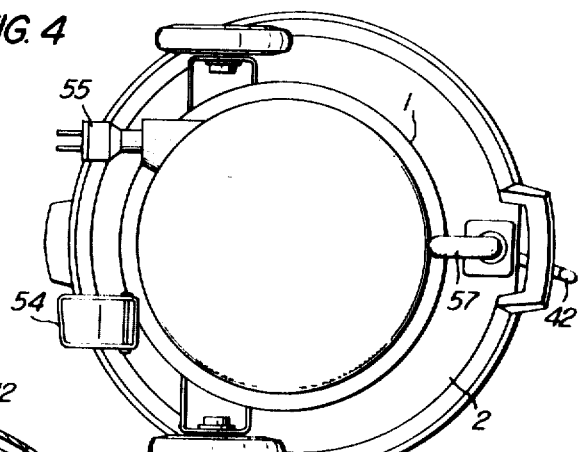
FIG. 4 is a bottom view thereof.
Figure 5:
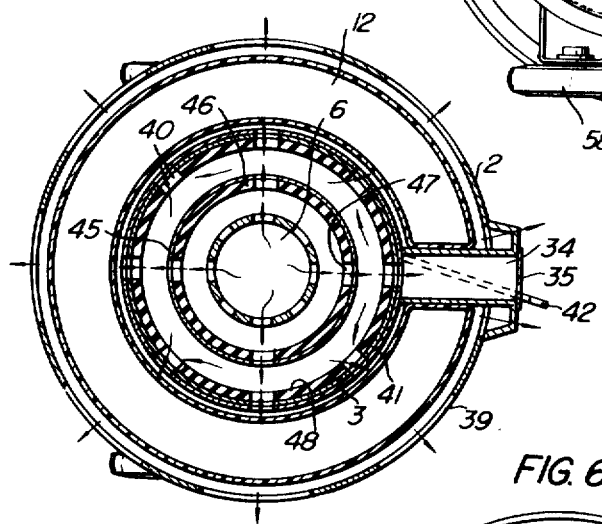
FIG. 5 is a cross-sectional view taken along the line V–V' of FIG. 3.

First of all, the principle of the dust compressing action of the electric suction cleaner according to this invention will be explained in detail.

Referring to FIG. 1, reference character A represents a substantially non-air permeable wall composing a dust case, B filter means of relatively coarse mesh which is hardly clogged, C another filter means of finer mesh which in practice is a cloth filter, D a relatively large piece or particle of dust, such as flue and paper chips, which is caught by the filter means B, and E a relatively fine piece or particle of dust, such as sand, which is caught by the cloth filter C.

A curve W–P represents the relationship between amount of dust W sucked into the dust case A and pressure loss P when the interior of the dust case A has been filled with said dust D.

When considering only a dust layer $\Delta l$, a loss of air pressure acting on the dust layer is $\Delta P$ and this pressure loss $\Delta P$ acts strongly on the dust as being a compressive force, enabling the dust collecting capacity to be increased.

According to the present invention, the dust is compressed in the dust case A and therefore the air flow resistance may be increased by the dust packed in the dust case A.

In practice, however, the relatively large dust, such as flue and paper chips, does not give rise to a substantial increase in flow resistance even when it is sucked into the dust case in a considerable amount. Dust which is most detrimental to the air flow resistance is sand, and clogging of the cloth filter C will result when the amount of sand caught by said filter increases. However, of the dust in an ordinary household, the voluminal percentage of sand is relatively small, the major portion of the dust being flue and paper chips.

Although the apparent volume is large, the volume of the dust, such as flue and paper chips, can be reduced considerably by compressing and yet the dust in that state does not substantially impair the air permeability.

In the chart of FIG. 2, a curve F represents the relationship between the flow rate and the vacuum degree (hereinafter referred to as Q–H curve) in the initial stage when dust is not being sucked, G represents the Q–H curve after dust has been sucked slightly, H represents a suction limit, that is, the Q–H curve upon occurrence of clogging of the coarse filter means B, I represents an air flow resistance curve when the suction power is in effect and J represents the air flow resistance curve at the suction limit. As may be understood from the chart, the air flow resistance increases with the amount of dust collected, namely the air flow resistance curve moves from I to J, so that the Q–H curve moves from F to H.

When the Q–H curve is in the position G, it is possible to suck the dust, but in the position H the output of the suction means cannot overcome the flow resistance and thus a considerable suction ability is lost.

Any electric suction cleaner reaches its suction limit with the passage of operating time as described above, and in this view it is not too much to say that the performance of an electric suction cleaner can be evaluated by the amount of dust sucked for the same output of suction means. In other words, the quality of any one of the numerous electric suction cleaners can be determined by the amount of dust sucked in the period when the Q–H curves moves from the position F to the position H.

It will be understood that the factor which will be noted first among those which influence the amount of dust, referred to above, is the structure of the filter means disposed in the electric suction cleaner.

No matter how large the output of the suction means may be or, in other words, even when the vacuum degree is great and the Q–H curve is located on the right side of the curve F, a satisfactory dust collecting effect cannot be expected if the filter means becomes clogged promptly.

Such a problem can be solved by the present invention. Namely, according to the present invention, as described previously, relatively large dust, such as flue and paper chips, is caught by the filter means B having a coarse mesh and a relatively fine dust, such as sand, is caught by the filter means C having a finer mesh, and therefore the filter means will not be clogged quickly relative to the intended period of dust collecting operation.

In the early stage of the dust collecting operation, the dust caught by the filter means B consists substantially entirely of flue and paper chips but as the operation proceeds sand comes to be caught in addition to the flue and paper chips. Namely, the compressed layer of dust D consisting of flue, etc., acts as filter means per se for the fine dust, such as sand, entrained in air and catches such fine dust three-dimensionally. Yet further, the compressed layer of dust D in which the sand is caught three-dimensionally as above described, has such a characteristic feature that the flow resistance thereof is unexpectedly small. Thus, the load on the filter means C of finer mesh can be alleviated accordingly.

Another factor which is to be noted is the structure of the dust case used.

A perfect electric suction cleaner cannot be obtained unless consideration is given to the place where the dust is to be stored, regardless of how superior the suction means used may be and how satisfactory the structure of the filter may be in respect of avoiding early clogging.

Namely, with the capacity of the dust case being limited due to the appearance of the associated electric suction cleaner or to handling in use, it is preferable, in order to have the dust deposited most efficiently in said dust case, to forcibly compress the collected dust so as to reduce the apparent volume thereof.

As is obvious at a glance, flue is a light and flimsy, air permeable dust, whose weight is extremely small relative to its volume, and it is known that this type of dust will have sufficient air-permeability no matter to what size the apparent volume thereof is reduced by compression. Therefore, it may be said that the most advantageous method of collecting this kind of dust is to collect the same while reducing the volume of the dust by compression as it is collected.

Fortunately, the apparent volume of flue or bits of down can be reduced sufficiently under a relatively small compressive force. Therefore, when the dust case according to this invention is used, such a dust collecting operation as described above is possible by employment of only the suction means.

Now, specific embodiments of the present invention, based upon the above-described principle, will be described hereinafter with reference to the accompanying drawings.

Referring first to FIGS. 3 to 7 inclusive, an outer casing 2 of the electric suction cleaner is securely mounted on top of a base 1 by means of bolts or other suitable fixing means.

The outer casing 2 is cylindrical in shape and forms in the center of the bottom portion thereof an inwardly extending cylindrical supporting column 3, on which an electric motor unit 4, constituting suction means 6, and a blower unit 5 are mounted integrally therewith.

The top opening of the outer casing 2 is covered by a closure member 7. The closure member 7 is provided at the center of the underside thereof with a fixture 8 to which a trumpet-shaped supporting member 10 is fitted, said supporting member 10 having a plurality of vent holes 9 bored therein.

The inner surface of the outer casing 2 and the outer surface of the suction means 6 define therebetween an air space 11 in which is fitted a dust receptacle 12 which is molded of a substantially non-air permeable material, such as for example synthetic resin.

The dust receptacle 12 has a substantially doughnut-shaped structure with the top end open and is fitted in the cavity 11 in such a manner that it may be separated from the base 1 when the dust collected therein is desired to be discarded and further in such a manner as to enclose the suction means 6.

The top edge of the outer wall of the dust receptacle is flexed outwardly to form a flange 13, while the inner wall thereof constitutes a cylindrical portion 14 which is joggled at an intermediate portion to form an annular shoulder 15 for engagement with the outer peripheral face of the supporting column 3. The outer wall of the dust receptacle is also provided with an air inlet 17 for communication with a suction inlet 16 formed in the outer casing 2.

Figure 9:
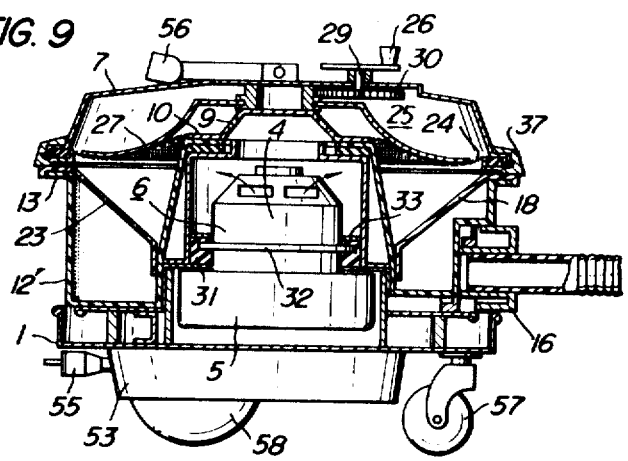
FIG. 9 is a vertical cross-sectional view of another embodiment of the present electric suction cleaner.

By shaping the outer wall of the dust receptacle 12 as shown in FIG. 9, it is possible to use the dust receptacle simultaneously as outer casing 2. Such an arrangement is advantageous in reducing the cost of the electric suction cleaner because the outer casing 2 can be eliminated and thereby the structure of the cleaner can be simplified compared to that shown in FIG. 3. Further, with such an arrangement, handling of the electric suction cleaner in use can be rendered easy.

In FIG. 9, partition plate 18 is formed funnel-shaped and the collecting space for fine dust is increased. Furthermore, fine pieces or particles of dust dropped from the cloth filter 24 are quietly stored at the bottom of the funnel-shaped partition.

Figure 6:
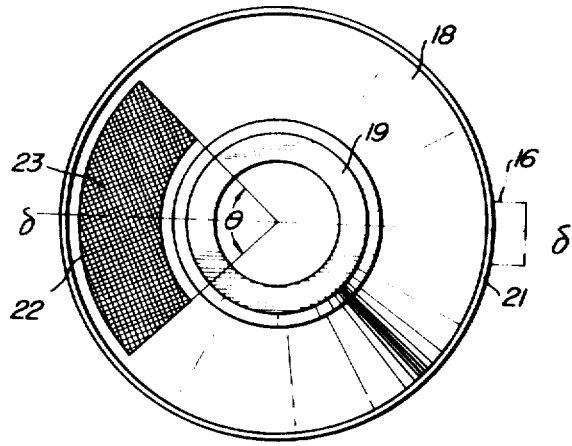
FIG. 6 is an enlarged plan view of a partition plate constituting a part of the dust case.

The top opening of the dust receptacle 12 is provided with an annular partition 18 as shown in FIG. 6, which is made, for example, of synthetic resin and removable from said dust receptacle. The inner edge 19 of the partition 18 extends over the top end of the cylindrical inner wall 14 of the dust receptacle 12 and pressed thereagainst by the peripheral edge of the aforesaid supporting member 10 with a packing 20 interposed between it and said supporting member. The outer peripheral edge 21 of the partition 18 is flexed upwardly along the inner wall of the dust receptacle 12.

Figure 7:
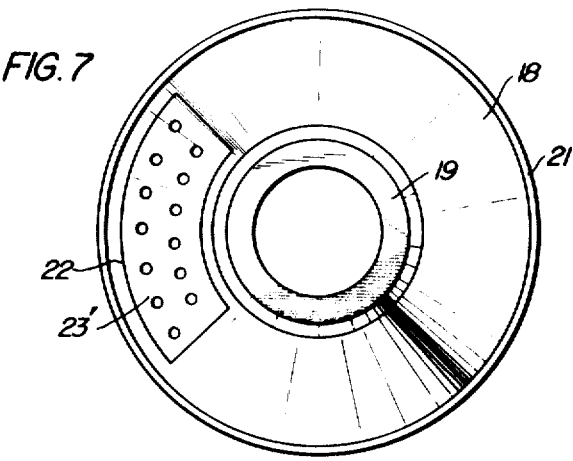
FIG. 7 is an enlarged plan view of another form of the partition plate.

The partition 18 is provided at a portion thereof with an air passage window 22 and this air passage window is covered with filter means of relatively coarse mesh being less susceptible to clogging, such as a screen filter 23 of coarse mesh. Said coarse filter means, such as the screen filter 23 may be substituted by a filter plate 23' having a plurality of holes perforated therethrough as shown in FIG. 7. Both of the screen filter 23 and the perforated filter plate 23' serve to catch relatively large dust, such as flue and paper chips, entrained in a dust-containing air passing therethrough, but permit relatively small dust, such as sand, to pass therethrough. As compared with the screen filter 23, the perforated filter plate 23' enables the production cost to be reduced to some extent as it is easier to produce than the former.

Figure 8:
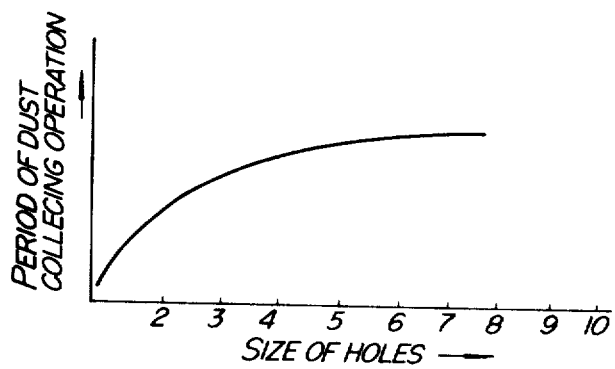
FIG. 8 is a characteristic chart illustrating the relationship between the size of mesh of a coarse filter and the amount of the dust collected thereby.

The size of the holes is closely related to the period of dust collecting operation, i.e. the amount of dust collected, before occurrence of clogging of said holes. This relationship is shown in FIG. 8 wherein the axis of the abscissa is scaled by the diameter (mm.) of the holes.

Generally speaking, the dust in a home consists of about 40% by weight of cottony component and about 60% by weight of sandy component. Therefore, with only the aforesaid filter means, i.e. the coarse screen filter 23 or the perforated filter plate 23', the sandy component which occupies as large as 60% by weight of the total dust cannot be removed. In order to catch sand, another filter means of finer mesh, which is a cloth filter 24 in this embodiment, is provided on the down-stream side of said first filter means.

The cloth filter 24 used in the present invention has a mesh so selected that it is sufficiently capable of catching sand.

The partition 18 provided with the coarse filter means as described above, is substantially non-air permeable except for the air passage window 22 and, together with the non-air permeable dust receptacle 12, constitutes a dust case referred to in the present invention.

In order to make the most effective use of the dust receptacle 12, the air passage window 22 in the partition 18 is preferably located at the point most remote from the suction inlet 16 as shown in FIG. 3, but may be located slightly closer to said suction inlet.

That portion of the partition 18 except for the air passage window 22 is preferably non-air permeable as mentioned above, but may be of a net structure of extremely fine mesh. Namely, in this case the portion of the partition 18 other than the air passage window 22 can no longer be said to be non-air permeable but becomes clogged after only a short period of the dust collecting operation, so that the partition produces the same effect as the one which is non-air permeable except for the air passage window 22.

The entire surface of partition plate 18 may also be constituted of relatively coarse screen structure if the suction inlet 16 and the partition plate 18 are constructed and arranged in such a manner that the dust-containing air of a sufficient velocity from the suction inlet 16 may flow substantially in parallel with said screen wherein the amount of air which leaks through said screen in the vicinity of the suction inlet will be negligibly small by virtue of the inertia of the air flow.

Foregoing construction may also be considered as an air space of such configuration as to positively direct the flow of dust-containing air passing through the inlet toward the outlet for predetermined distance at least in the vicinity of the inlet according to the present invention.

Reference to the non-air permeable dust case in the present invention includes one which is composed of such a partition as above described.

The chart of FIG. 13 illustrates the relationship between the proportion of the area of the air passage window 22 to the total area of the partition 18 and the amount of dust collected. From this chart, it will be seen that when the dust collecting index is represented by 40 for the case wherein the opening angle of the air passage window 22 is 360°, that is, the case wherein the partition 18 is entirely composed of a coarse screen filter 23, the dust collecting index rises gradually as the opening angle of said window 22 decreases and reaches the highest value at the opening angle of about 135 to 180°. Thus, it will be understood that the air passage window 22 in the shutter actually used in the electric suction cleaner is preferably formed at an opening angle of about 135 to 180° but may be formed at an angle outside said range.

As described previously, the air passage window 22 is preferably formed at a location most remote from the suction inlet 16. To do so, it is only necessary to form the air passage window 22 so that the bisector of the angle $\theta = 135$ to $180°$ may be aligned with an extension of a line $\delta—\delta$ passing through the center of the suction inlet 16.

Although in the foregoing embodiment, the window 22 is formed at a location remote from and opposite to the inlet 16, it may be formed at a location closer to the inlet when a partition or guide member is employed in the dust receptacle at the inlet for guiding all of the incoming air to the direction opposite to the location of the window.

Furthermore, according to the invention the direction of flow of dust-containing air is rapidly changed in the vicinity of the window which is located remotest from the inlet in the direction of air flow. This rapid change in the direction of flow makes the dust separate from the incoming air by virtue of inertia difference. Thus dusts can be effectively collected even in a space remote from the inlet, that is, the dead space of the dust receptacle, where in conventional suction cleaners dusts can not be stored.

The cloth filter 24 becomes clogged by sand deposited in the mesh thereof as the cleaning operation proceeds, causing a sharp reduction of the suction ability. It is, therefore, necessary to remove the sand from the cloth filter at a suitable time interval. For this purpose, the present electric suction cleaner has dust removing means 25 provided on the closure member 7, which is conveniently operated externally.

The dust removing means 25 is rotatably mounted on a cylindrical portion of the supporting member 10 and operated externally by way of a handle 26. Namely, the dust removing means 25 includes a plurality of radial arms 27 adapted to slide on that surface of the cloth filter 24 opposite to the dust collecting surface, the aforesaid handle 26 connected to the top end of a rotary shaft 29 which is rotatably supported in the closure member 7 through a bearing 28, and a gearing 30 engaging the other end of the rotary shaft 29 for transmitting the rotation of the handle 26 to the arms 27.

The suction means 6 has an annular projection 32 formed on the outer surface thereof, at which said suction means is supported on the supporting column 3 and secured thereto by a pressing member 33 with a rubber damper 31 interposed therebetween. Thus, it will be seen that vibration of the suction means 6 is damped by the rubber damper 31.

The other casing 2 is provided with an exhaust outlet 34 below the suction inlet 16 which is communicating with the interior of the supporting column 3 at one end and with the atmosphere at the other end. The outer open end of the exhaust outlet 34 is closed by a cover 35 which can be opened during the normal cleaning operation.

The closure member 7 is hinged to the outer casing 2 as at 36 and provided with a catch 37 which is adapted to engage the upper peripheral edge of the outer casing 2 under the bias of a leaf spring 38.

Reference numeral 39 designates auxiliary exhaust outlets formed between the upper peripheral edge of the outer casing 2 and the closure member 7 along the entire periphery of the outer casing, and 40 designates a plurality of equally spaced air passage holes formed in the peripheral wall of the supporting column 3. The air passage openings 40 are opened and closed by an annular sliding band 41 slidably disposed along the outer face of the supporting column 3.

The sliding band 41 is formed therein with air passage holes at locations corresponding to the air passage holes 40 in the supporting column 3. The air inside the supporting column 3 is discharged through the individual exhaust outlet 39 when the air passage holes in the sliding band are in communication with the corresponding air passage holes 40 in the side wall of the supporting column, whereas it is discharged through the exhaust outlet 34 when the air passage holes 40 are closed by said sliding band. In the latter case, the electric suction cleaner can be used as a blower.

The sliding band 41 is operated by an operating lever 42 which has one end connected to said sliding band and the other end projecting outwardly through the outer casing 2, with the intermediate portion thereof supported by a pin 43 securely disposed between the inner face of the bottom wall of said outer casing and the outer face of the wall of said exhaust outlet 34.

Reference numeral 44 designates an exhaust passage defined by the inner surface of the outer casing 2 and the outer peripheral surface of the dust receptacle 12, and 45 designates a cylindrical acoustic member having the inner surface lined with a layer 46 of acoustic material and disposed within the supporting column 3 in such a manner as to surround the electric motor unit 4, said acoustic member having an air passage hole 47 formed therein.

The inner surface of the supporting column 3 is also lined with a layer 49 of acoustical absorbent firmly bonded thereto. Provided underneath of the base 1 is a cord winding means 49 which is rotatably mounted on a fixed pin 50. The cord winding means 49 includes a winding reel 52 urged to rotate in one direction under the bias of a helical spring not shown for winding a cord 51, a cover 53 enclosing said reel and a brake pedal 54 for controlling the rotation of said reel 52.

Reference numeral 55 designates a plug provided at the free end of the cord 51 for connection with a power source, 56 a handle provided on top of the closure member 7 and by which the electric suction cleaner is carried, and 57 and 58 a pivotable wheel and fixed wheels respectively.

The electric suction cleaner having a construction as described hereinabove will operate in the following manner. Namely, when the electric motor unit 4 is set in operation, dust-containing air sucked through the suction inlet 16 enters the dust receptacle 12 and is diverged into two streams upon colliding against the opposite wall of said dust receptacle. After flowing through the doughnut-shaped cavity around the suction means 6, the two streams of air encounter each other on the opposite side of the suction inlet 16. Then, the dust-containing air passes through the coarse filter means, i.e. the screen filter 23 or perforated filter plate 23', covering the air passage window 22 in the partition 18 at the top open end of the dust receptacle 12, whereby relatively large dust, such as flue or paper chips, is caught thereon.

The dust-containing air passing through said coarse filter means further passes through the filter means of finer mesh, i.e. the cloth filter 24, on the down-stream side of said first filter means, whereby fine dust, such as sand, is caught thereon.

As the amount of dust in the dust receptacle 12, collected by the coarse filter means 23 in the manner described, increases, the area of flow passage is decreased and a condition occurs wherein the dust-containing air from the suction inlet 16 is forcibly passed through the layer of dust collected in said dust receptacle. As a result, the dust collected is compressed by the energy of the air flow, that is, a force corresponding to a change in flow resistance.

Since the dust compressed in the manner described while it is collected, acts as a filter catching fine dust, such as sand, three-dimensionally, the amount of sand being caught by the cloth filter decreases sharply after operation of the cleaner for a certain time.

Next, another embodiment of this invention will be described with reference to FIGS. 10 to 12 inclusive.

In this embodiment, as shown, an outer casing 59 of the electric suction cleaner has a front cover 60 which is openably connected to the front end of said outer casing by means of a hinge 61 and held in a closed position by a latch 62. Between the rear end surface 63 of the front cover 60 and the outer surface of an annular projection 64, formed interior of the outer casing 59 are disposed air-tightly annular packings 65 and 66.

The packing 65 has a cylindrical dust case 69 air-tightly connected thereto. The dust case 69 is substantially non-air permeable and provided with a plurality of air passage windows 68 in the rear end portion of the cylindrical wall thereof which are covered with coarse filter means 67 similar to that described previously with reference to FIGS. 4 and 5. The air passage windows 68 are spaced from each other peripherally of the wall of dust case 69 and the filter means 67 are supported by portions 70 of the cylindrical wall and an end wall 71 of the dust case. Such arrangement is advantageous in preventing the filter means 67 from breakage caused by heavy dust entrained in the air stream sucked through a suction inlet 72 and colliding against said filter means.

The exterior of the filter means 69 is surrounded by another filter means 73 of finer mesh, consisting of a cloth filter or the like and connected to the packing 66.

Reference 74 designates suction means including an electric motor unit 75 and a blower unit 76. The suction means 74 is mounted on a bracket 80 in the outer casing 59 and held in position by an annular projection 77 which is fixedly secured by a pressing member 79 with a rubber damper 78 interposed therebetween.

Reference numeral 81 designates a handle provided on top of the outer casing 59, and 82 and 83 designate a pivotable wheel and fixed wheels respectively provided at the lower portion of the outer casing 59.

In operation, the dust contained in the air stream sucked through the suction inlet 72 by suction means 74, enters into the dust case 69, wherein relatively large dust, such as flue and paper chips, is caught by the coarse filter means 67, and relatively fine dust, such as sand, passing through said filter means is caught by the cloth filter 73, as in the electric suction cleaner shown in foregoing FIGS. 3 to 8. After having caught selectively various elements of dust in the dust case 69 by means of cloth filter 73 thereof in the manner described, the dust-free air is discharged to the outside of outer casing 59 through an exhaust outlet 84.

The electric suction cleaner of the present invention has the advantage that a large amount of dust can be collected in a dust case of fixed capacity, because the so-called light and flimsy dust whose apparent volume is extremely large for its weight is positively compressed and reduced in volume by the energy of the dust-containing air stream sucked into the cleaner.

Another advantage is that the compressed dust when it reaches a certain amount acts as a filter per se for dust, such as sand, which will cause clogging of the finer filter means, whereby the air reaching the finer filter means is previously cleaned and thus the load on said finer filter means is alleviated. The fact that the compressed dust acts as a filter constitutes a very important feature of the present invenion.

The experimental result has revealed that the compressed dust does not become clogged even when sand is caught therein and accordingly will not substantially increase the overall flow resistance.

Such meritorious features of the present invention as set forth above provide the further advantage that the collected dust is required to be discarded much less frequently than with the conventional electric suction cleaners, so that the present electric suction cleaner can be operated with less labor and more comfort.

The filter means used in the present invention is characterized by the dual structure composed of the coarse filter means which is less susceptible to clogging, and the filter means of finer mesh. With such structure, it is possible to prolong the cleaning operation time before the occurrence of clogging of the filter means, as compared with the conventional cleaners wherein various size of dust elements are collected indiscriminately in one step, because relatively large dust, such as flue, is caught by the coarse filter means beforehand and fine dust, such as sand, which tends to cause clogging of the filter means is permitted to pass through said filter means and is finally caught by the finer filter means.

This means that the time interval in which the dust is compressed in the dust case, that is, the time interval in which the Q-H curve is shifted from the position F to the position H, is extended, and consequently a larger amount of dust can be collected. For ordinary domestic use, the cleaner can be used efficiently without throwing away collected dusts, for about six months.

Still another advantage of the present invention resides in the fact that the handling of the compressed dust, which is in a bulky mass, is rendered extremely simple and the time required for the disposition of the same can be markedly shortened.

It is also to be noted that in the conventional electric suction cleaners filter means which is expensive is provided over the entire area of the dust case so as to increase the effective area of air passage, and accordingly a large amount of filter means is required, making the cost of the cleaners high. According to the present invention, however, it is only necessary to use the filter means to cover a window of small area formed at a portion of the dust case and therefore use of expensive filter means can be minimized and yet excellent dust collecting ability can be obtained with lower possibility of clogging as compared with the conventional ones.

It is also to be understood that while not shown in the drawings, by disposing a dust collecting bag in the dust case in close contact therewith, in place of coarse filter means being less susceptible to clogging, disposition of dust can be further facilitated as the dust is collected and compressed in said dust collecting bag.

What is claimed is:

1. An electric suction cleaner comprising: an outer casing; suction means provided in the outer casing for sucking dust along with air; means for introducing said dust-containing air into said outer casing; said outer casing being of a substantially non-air permeable structure having an inlet and an outlet for air defining an air space of such configuration as to positively direct the flows of dust-containing air passing through said inlet toward said outlet making said flows face each other for a predetermined distance at least in the vicinity of said outlet; a dust receptacle forming an approximately doughnut-shaped dust accumulating chamber around said suction means for receiving the dust-containing air from said inlet of said outer casing and having an annular partition mounted on an open end thereof, said partition being provided with an air passage window; first filter means of relatively coarse mess which is less susceptible to clogging and is disposed at said air passage window for collecting dust of a larger size from the dust-containing air and providing compression on said collected dust by the energy of said flows of dust-containing air so that an apparent volume of the dust collected in said dust receptacle may be reduced; and second filter means of finer mesh disposed on the downstream side of said first filter means for collecting dust of a smaller size from the dust-containing air.

2. An electric suction cleaner according to claim 1, wherein said air passage window is formed in said annular partition at a location most remote from a portion of the dust receptacle through which the dust receptacle introduces the dust-containing air.

3. An electric suction cleaner according to claim 2, wherein said air passage window extends concentrically with said annular partition through a central angle of about 135 to 180°.

4. An electric suction cleaner according to claim 1, wherein externally operable dust removing means is provided on the backside of said finer filter means.

5. An electric suction cleaner according to claim 1, wherein said first coarse filter means is a screen filter.

6. An electric suction cleaner according to claim 1, wherein said first coarse filter means is a filter plate having a number of apertures punched therethrough.

References Cited

UNITED STATES PATENTS

| 3,343,344 | 9/1967 | Fairaizl et al. | 55—472 X |
|---|---|---|---|
| 3,365,864 | 1/1968 | Iizima | 55—522 X |
| 3,413,779 | 12/1968 | Takahashi et al. | 15—327 X |
| 2,226,630 | 12/1940 | McCord | 55—323 X |
| 2,276,844 | 3/1942 | Holm-Hansen | 15—327 (D) X |

WALTER A. SCHEEL, Primary Examiner

C. K. MOORE, Assistant Examiner

U.S. Cl. X.R.

15—323, 326, 327 D, 352; 55—305, 319, 323, 471, 472, 482